United States Patent
Stewart (12)

(10) Patent No.: US 6,565,162 B2
(45) Date of Patent: May 20, 2003

(54) TRACKED VEHICLE AND TENSION ADJUSTMENT ASSEMBLY

(75) Inventor: Christopher G. Stewart, Oil City, PA (US)

(73) Assignee: Joy MM Delaware, Inc.

( * ) Notice: Subject to any disclaimer, the term of this patent is extended or adjusted under 35 U.S.C. 154(b) by 0 days.

(21) Appl. No.: 09/970,428

(22) Filed: Oct. 3, 2001

(65) Prior Publication Data

US 2002/0038978 A1 Apr. 4, 2002

Related U.S. Application Data

(60) Provisional application No. 60/237,897, filed on Oct. 4, 2000.

(51) Int. Cl.$^7$ .......................... B62D 55/00; F16H 7/08; B60G 5/00
(52) U.S. Cl. ...................... 305/153; 305/143; 305/155
(58) Field of Search ........................... 305/143, 144, 305/153, 155, 154; 474/101; 198/336, 813, 816

(56) References Cited

U.S. PATENT DOCUMENTS

| | | | | |
|---|---|---|---|---|
| 3,118,315 A | * | 1/1964 | Loosli | 198/816 |
| 3,332,725 A | * | 7/1967 | Reinsma | 305/153 |
| 5,947,264 A | * | 9/1999 | Eltvedt | 198/816 |
| 6,027,185 A | * | 2/2000 | Crabb | 305/148 |
| 6,062,327 A | * | 5/2000 | Ketting et al. | 305/144 |
| 6,273,530 B1 | * | 8/2001 | Johnson et al. | 305/116 |

* cited by examiner

Primary Examiner—S. Joseph Morano
Assistant Examiner—Jason R. Bellinger
(74) Attorney, Agent, or Firm—James Earl Lowe, Jr.

(57) ABSTRACT

A tension adjustment assembly for a tracked vehicle, the tracked vehicle including a frame, an endless track, a track-engaging wheel supported by the frame, and a second track-engaging wheel supported by the frame in spaced relation to the first track-engaging wheel. The first track-engaging wheel and the second track-engaging wheel are rotatable about a first axis and a second axis, respectively. The endless track extends about the first track-engaging wheel and the second track-engaging wheel, and the track has a tension. The first track-engaging wheel is movable relative to the frame in a direction perpendicular to the first axis to adjust the tension of the track. The assembly further comprises a tension adjustment mechanism connected to the first track-engaging wheel and operable to move the first track-engaging wheel, the tension adjustment mechanism including a rotatable member rotatable about a rotational axis to cause movement of the first track-engaging wheel relative to the frame. The assembly also includes a shaft rotatably supported by the frame for rotation about a shaft axis generally transverse to the rotational axis; and a coupling connected between the shaft and the rotatable member to translate rotation of the shaft into rotation of the rotatable member to thereby move the first track-engaging wheel and adjust the tension of the track.

9 Claims, 2 Drawing Sheets

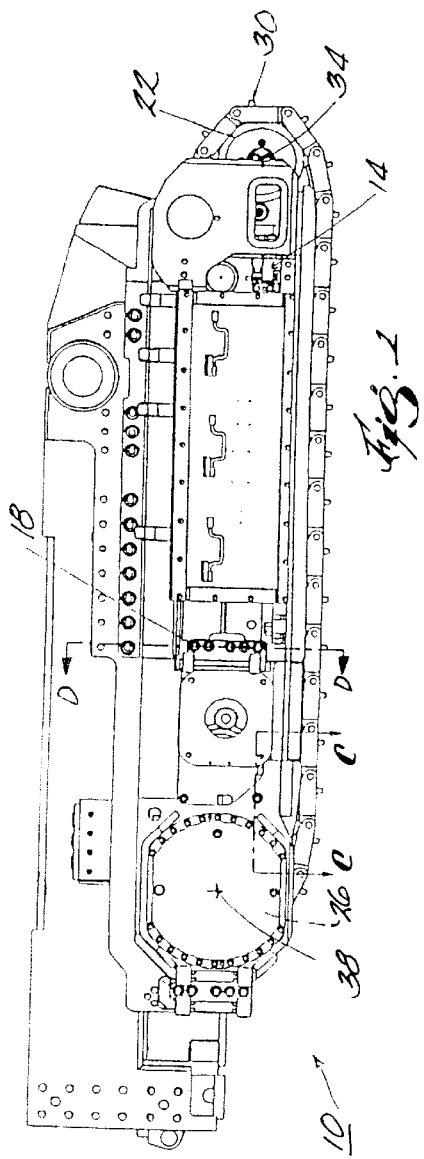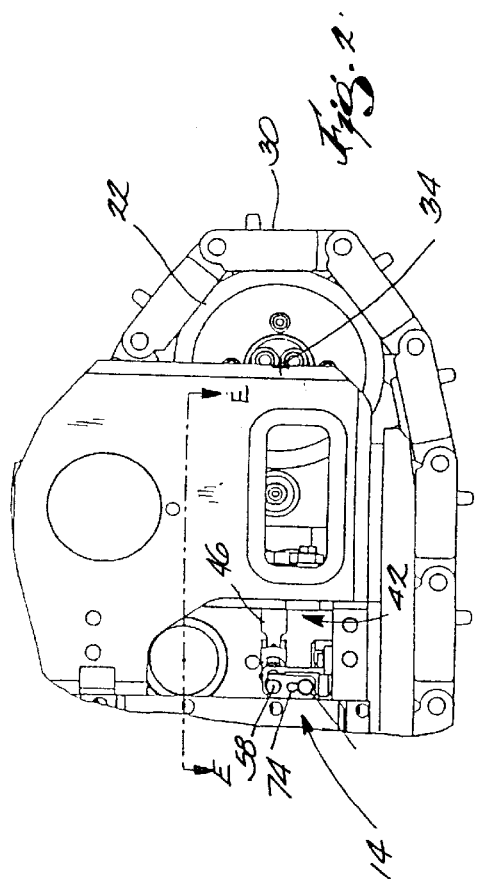

TRACKED VEHICLE AND TENSION ADJUSTMENT ASSEMBLY

RELATED APPLICATION

This application claims the benefit under 35 U.S.C. § 119 of U.S. Provisional Application No. 60/237,897 entitled TRACKED VEHICLE AND TENSION ADJUSTMENT ASSEMBLY, filed Oct. 4, 2000.

FIELD OF THE INVENTION

The present invention relates to tracked vehicles and, more particularly, to an assembly to adjust the track tension of the tracked vehicle.

BACKGROUND OF THE INVENTION

Generally, a tracked vehicle includes a frame, a first sprocket supported by the frame, a second sprocket supported by the frame in spaced relation to the first sprocket, the first sprocket and the second sprocket being rotatable about a first axis and a second axis, respectively, and an endless track extending about the first sprocket and the second sprocket. One of the first sprocket and the second sprocket, for example, the first sprocket, is movable relative to the frame in a direction perpendicular to the first axis to adjust the tension of the track.

The vehicle also includes a tension adjustment assembly to adjust the track tension. A typical adjustment assembly includes a cylinder assembly connected to the movable sprocket and operable to move the sprocket to adjust the track tension. The cylinder assembly includes a movable member connected to the movable sprocket and movable along a movable member axis generally perpendicular to the movable sprocket axis, and a rotatable member connected to the movable member and rotatable about the movable member axis to cause movement of the movable member along the movable member axis.

The rotatable member includes an operating end which is engaged by an operator with an adjustment tool, such as a wrench. When the rotatable member is rotated, the movable member moves along the movable member axis to move the movable sprocket and to thereby adjust the tension of the track.

SUMMARY OF THE INVENTION

One problem with the above-described adjustment assembly is that the operating end of the rotatable member is located inwardly of the outer edge of the track and/or of the frame. As a result, the operating end is difficult to reach and engage with the adjustment tool.

Another problem with the above-described adjustment assembly is that adjustment tool is rotated in a plane which is generally perpendicular to the movable member axis and to the plane defined by the outer surface of the track and/or of the frame. Due to the restrictions of the track and/or of the frame, the adjustment tool can only rotate in narrow arc to adjust the rotatable member and must be continuously disengaged and repositioned to adjust the track tension.

The present invention substantially alleviates the problems with the above-described adjustment assembly and tracked vehicle. In particular, the adjustment assembly of the present invention includes a rotatable shaft located outwardly from the operating end of the rotatable member and a coupling connected between the shaft and the rotatable member for rotating the rotating member in response to rotation of the shaft. Preferably, the shaft is transverse to the rotating member, and the coupling transmits rotation "around a corner." The operating end of the shaft is more easily engageable by the adjustment tool. Also, because the adjustment tool rotates in a plane generally parallel to the plane defined by the outer surface of the track and/or of the frame, the adjustment tool can rotate in a greater arc without being interfered with by the track and/or by the frame.

More particularly, the present invention provides a track tension adjustment assembly including a tension adjustment mechanism connected to a movable sprocket, a shaft supported for rotation about a shaft axis extending at an outward angle from and, preferably, generally transverse to the rotatable member axis and a coupling connected between the shaft and the rotatable member to translate rotation of said shaft into rotation of the rotatable member to thereby move the movable sprocket and adjust the tension of the track. The adjustment assembly also preferably includes a keeper assembly selectively engageable with the shaft to prevent rotation of the shaft and to prevent adjustment of the track tension.

In addition, the present invention provides a tracked vehicle including a frame, first and second sprockets, a track extending about the sprockets, and a tension adjustment assembly. One of the sprockets is movable relative to the frame to adjust the tension of the track. The tension adjustment assembly includes a tension adjustment mechanism connected to the movable sprocket, a shaft supported for rotation about a shaft axis extending generally transverse to the rotatable member axis and a coupling connected between the shaft and the rotatable member to translate rotation of said shaft into rotation of the rotatable member to thereby move the movable sprocket and adjust the tension of the track.

Other features and advantages of the invention will become apparent to those skilled in the art upon review of the following detailed description, claims and drawings.

BRIEF DESCRIPTION OF THE DRAWINGS

FIG. 1 is a side view of a tracked vehicle and tension adjustment assembly embodying the invention.

FIG. 2 is a side view of a portion of the vehicle and of the adjustment assembly shown in FIG. 1.

Figure 3:
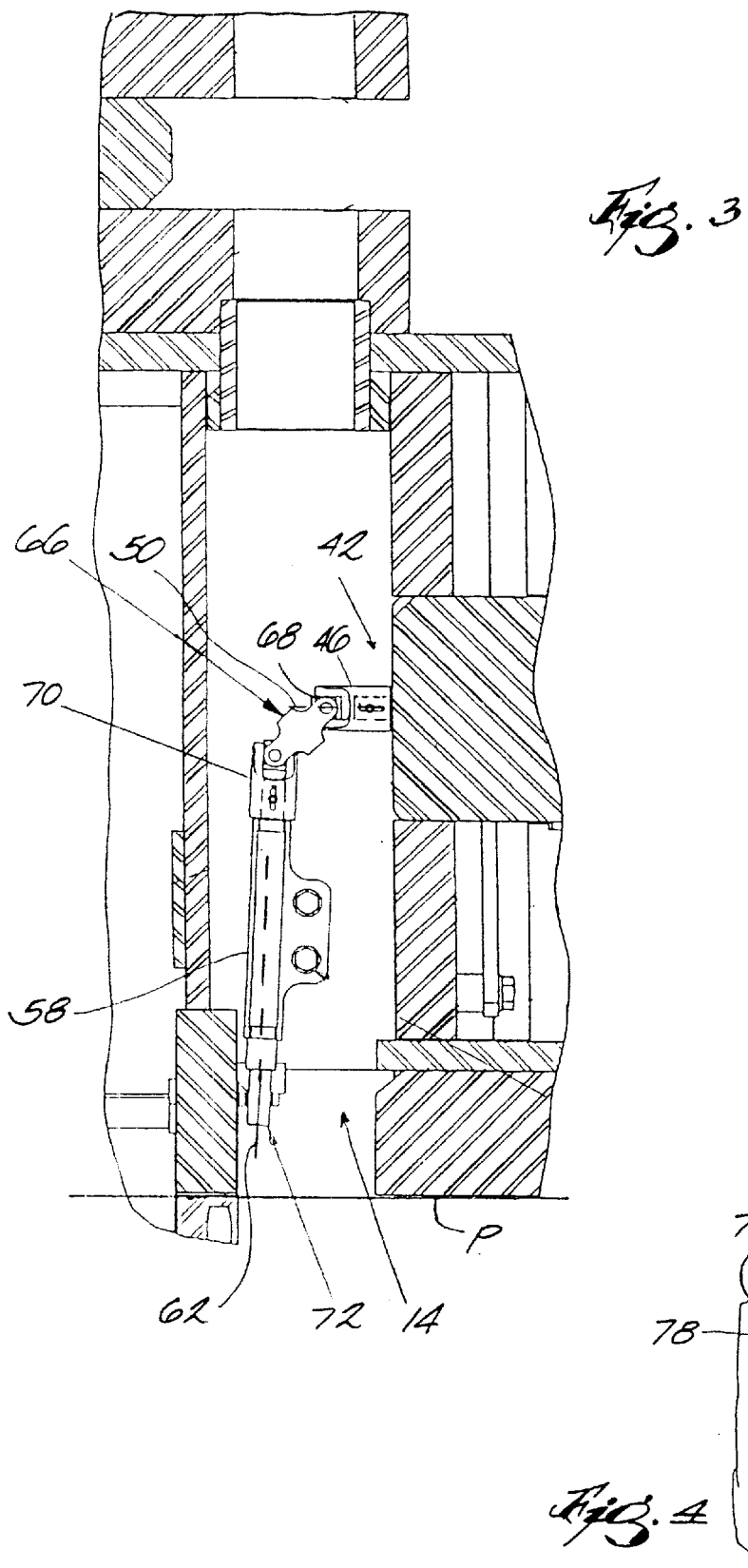
FIG. 3 is a partial cross-sectional top view taken generally along line E—E in FIG. 2.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

A tracked vehicle 10 including a tension adjustment assembly 14 embodying the invention is illustrated in FIG. 1. The vehicle 10 could be, for example, a continuous miner, but the invention is applicable to any tracked vehicle.

The vehicle 10 includes a frame 18 supported for movement over ground by first and second track drive assemblies 20 (one shown). Each drive assembly 20 includes spaced apart track-engaging wheels, such as first and second sprockets 22 and 26, and an endless track or crawler chain 30 extending about the sprockets 22 and 26. The drive assemblies 20 are driven by a motor and transmission assembly (not shown), as is known in the art.

The sprockets 22 and 26 are rotatable about generally parallel first and second axes 34 and 38, respectively. One of the sprockets, for example, the first sprocket 22 is movable relative to the frame 18 in a direction generally perpendicular to the first axis 34 to adjust the tension of the track 30.

To adjust the tension of the track 30, the vehicle 10 includes (see FIGS. 2–4) the tension adjustment assembly 14. The adjustment assembly 14 includes a generally convention tension adjustment mechanism 42 connected to the movable sprocket 22 and operable to move the movable sprocket 22. The adjustment mechanism 42 includes a rotatable member 46 which is rotatable about an axis 50 generally perpendicular to the first axis 34. Rotation of the rotatable member 46 about the axis 50 in one direction causes movement of the sprocket 22 toward an extended position, in which the track tension is tightened, and rotation in the other direction causes movement of the sprocket 22 toward a retracted position, in which the track tension is loosened. The adjustment mechanism 42 is positioned inwardly of the movable sprocket 22 relative to the axis 34. In the prior art, to operate such an adjustment mechanism 42, an operator must reach inside the track 30 with an adjustment tool (not shown) to rotate the rotatable member 46.

The adjustment assembly 14 also includes a shaft 58 rotatably supported by the frame 18 for rotation about a shaft axis 62 angled outwardly from (along the first axis 34) and, preferably, generally transverse to the axis 50. A universal coupling 66 is connected between the shaft 58 and the rotatable member 46 to transmit rotation of the shaft 58 about the shaft axis 62 into rotation of the rotatable member 46 about the rotatable member axis 50. Rotation of the shaft 58 about the shaft axis 62 in one direction, i.e., clockwise in FIG. 2, causes movement of the sprocket 22 toward the extended position, and rotation in the other direction, i.e., counterclockwise in FIG. 2, causes movement of the sprocket 22 toward the retracted position to thereby adjust the tension of the track 30.

The outer surface of the track 30 and/or of the frame 18 defines a vertical plane P (shown in FIG. 3). The end 68 of the rotatable member 46 (connected to the coupling 66) is positioned inwardly of this vertical plane P, inwardly of the outer surface of the track 30 and inwardly of the movable sprocket 22. The shaft 58 is oriented relative to the cylinder assembly 42 to have an inner end 70 (connected to the coupling 66) and an operating end 72 positioned outwardly of the end 68 of the rotatable member 46 along the first axis 34. For ease of access and operation, the operating end 72 of the shaft 58 is preferably positioned proximate the vertical plane P and proximate to the outer surface of the track 30 and/or by the frame 18.

Figure 4:
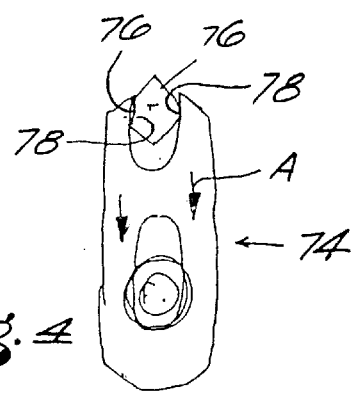
FIG. 4 is a side view of a portion of the adjustment assembly shown in FIG. 2.

As shown in FIGS. 2 and 4, the adjustment assembly 14 further includes a keeper assembly 74 engageable with the shaft 58 to prevent rotation of the shaft 58 and to prevent adjustment of the track tension. The keeper assembly 74 is movable between a locking position (shown in FIG. 4), in which the keeper assembly 74 engages the shaft 58 to prevent rotation of the shaft 58, and an unlocked position (moved in the direction of arrow A in FIG. 4), in which the keeper assembly 74 is disengaged from the shaft 58 to allow rotation of the shaft 58 and adjustment of the tension of the track 30.

As shown in FIG. 4, the shaft 58 has at least one shaft locking surface 76, and the keeper assembly 74 has at least one keeper locking surface 78 engageable with the shaft locking surface 76 to prevent rotation of the shaft 58. Preferably, proximate the operating end 72 of the shaft 58, the shaft 58 has a polygonal (e.g., hexagonal) shape with a plurality of shaft locking surfaces 76 which are engageable with opposing keeper locking surfaces 78 to prevent rotation of the shaft 58 in several rotated positions of the shaft 58.

In operation, to adjust the tension of the track 30, the keeper assembly 74 is moved from the locking position (shown in FIG. 4) to the unlocked position (in the direction of arrow A in FIG. 4). An adjustment tool (not shown) is engaged on the operating end 72 of the shaft 58. The operator rotates the adjustment tool and the shaft 58 to adjust the track tension as desired and as described above. When the track tension is set, the adjustment tool is removed from the operating end 72, and the keeper assembly 74 is moved from the unlocked position (in a direction opposite to arrow A) to the locking position (shown in FIG. 4).

Because the operating end 72 is proximate the vertical plane P and the outer surface of the track 30 and/or of the frame 18, the operating end 72 is easily accessible by an operator. Also, because the adjustment tool is rotated in a plane parallel to that vertical plane P, the adjustment tool can be rotated through a greater arc (of possibly 360°) without requiring removal and repositioning during adjustment.

Various features of the invention are set forth in the following claims.

I claim:

1. A tension adjustment assembly for a tracked vehicle, the tracked vehicle including a frame, an endless track, a track-engaging wheel supported by the frame, a second track-engaging wheel supported by the frame in spaced relation to the first track-engaging wheel, the first track-engaging wheel and the second track-engaging wheel being rotatable about a first axis and a second axis, respectively, the endless track extending about the first track-engaging wheel and the second track-engaging wheel, the track having a tension, the first track-engaging wheel being movable relative to the frame in a direction perpendicular to the first axis to adjust the tension of the track, said assembly comprising:

a tension adjustment mechanism connected to the first track-engaging wheel and operable to move the first track-engaging wheel, said tension adjustment mechanism including a rotatable member rotatable about a rotational axis generally transverse to said wheel first and second axes to cause movement of the first track-engaging wheel relative to the frame;

a shaft rotatably supported by the frame for rotation about a shaft axis generally transverse to said rotational axis; and a coupling connected between said shaft and said rotatable member to translate rotation of said shaft into rotation of said rotatable member to thereby move the first track-engaging wheel and adjust the tension of the track.

2. The assembly as set forth in claim 1 and further comprising a keeper assembly engageable with said shaft to prevent rotation of said shaft.

3. The assembly as set forth in claim 2 wherein said keeper assembly is movable between a locking position, in which said keeper assembly engages said shaft to prevent rotation of said shaft, and an unlocked position, in which said keeper assembly is disengaged from said shaft to allow rotation of said shaft and adjustment of the tension of the track.

4. The assembly as set forth in claim 2 wherein said shaft has a shaft locking surface, and wherein said keeper assembly has a keeper locking surface engageable with said shaft locking surface to prevent rotation of said shaft.

5. A tracked vehicle comprising:

a frame;

a first sprocket supported by the frame and rotatable about a first axis;

a second sprocket supported by the frame in spaced relation to the first sprocket, said second sprocket being rotatable about a second axis;

an endless track extending about said first sprocket and said second sprocket, said track having a tension, said first sprocket being movable relative to said frame in a direction generally perpendicular to said first axis to adjust said tension of said track; and a tension adjustment assembly including a tension adjustment mechanism connected to said first sprocket and operable to move said first sprocket, said tension adjustment mechanism including a rotatable member rotatable about a rotational axis generally transverse to said wheel first and second axes to cause movement of said first sprocket relative to said frame, a shaft rotatably supported by the frame for rotation about a shaft axis generally transverse to said rotational axis, and a coupling connected between said shaft and said rotatable member to translate rotation of said shaft into rotation of said rotatable member to thereby move the first sprocket and adjust the tension of the track.

6. The vehicle as set forth in claim 5 wherein said tension adjustment assembly further includes a keeper assembly engageable with said shaft to prevent rotation of said shaft.

7. The vehicle as set forth in claim 6 wherein said keeper assembly is movable between a locking position, in which said keeper assembly engages said shaft to prevent rotation of said shaft, and an unlocked position, in which said keeper assembly is disengaged from said shaft to allow rotation of said shaft and adjustment of the tension of the track.

8. The vehicle as set forth in claim 6 wherein said shaft has a shaft locking surface, and wherein said keeper assembly has a keeper locking surface engageable with said shaft locking surface to prevent rotation of said shaft.

9. The vehicle as set forth in claim 6 wherein said track has an inner surface and an outer surface spaced from said inner surface along said first axis, wherein said rotatable member has an end connected to said coupling, said end being positioned inwardly of said outer surface of said track, and wherein said shaft has a first end connected to said coupling and a second end engageable to rotate said shaft, said second end of said shaft being spaced outwardly of said end of said rotatable member.

* * * * *